(12) United States Patent
Moon et al.

(10) Patent No.: US 7,000,052 B2
(45) Date of Patent: Feb. 14, 2006

(54) SYSTEM AND METHOD FOR CONFIGURING AND DEPLOYING INPUT/OUTPUT CARDS IN A COMMUNICATIONS ENVIRONMENT

(75) Inventors: Billy G. Moon, Morrisville, NC (US); Mark G. Schnell, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 10/373,559

(22) Filed: Feb. 24, 2003

(65) Prior Publication Data

US 2004/0177196 A1 Sep. 9, 2004

(51) Int. Cl.
*G06F 13/00* (2006.01)

(52) U.S. Cl. .......................... 710/300; 710/104; 713/1; 713/2; 713/100

(58) Field of Classification Search ............... 710/300, 710/104; 713/1, 2, 100
See application file for complete search history.

(56) References Cited

U.S. PATENT DOCUMENTS

| | | | | |
|---|---|---|---|---|
| 5,426,739 | A | | 6/1995 | Lin et al. ..................... 395/325 |
| 5,530,895 | A | * | 6/1996 | Enstrom ........................ 710/9 |
| 5,764,924 | A | | 6/1998 | Hong .......................... 395/281 |
| 6,049,222 | A | * | 4/2000 | Lawman ...................... 326/38 |
| 6,065,068 | A | | 5/2000 | Foote ........................... 710/13 |
| 6,067,619 | A | * | 5/2000 | Melvin et al. ............... 713/100 |
| 6,138,180 | A | * | 10/2000 | Zegelin ........................ 710/11 |
| 6,178,445 | B1 | | 1/2001 | Dawkins et al. ............. 709/209 |
| 6,286,060 | B1 | | 9/2001 | DiGiorgio et al. ............. 710/31 |
| 6,295,299 | B1 | | 9/2001 | Haddock et al. ............ 370/423 |
| 6,385,667 | B1 | * | 5/2002 | Estakhri et al. ................ 710/8 |
| 6,418,486 | B1 | * | 7/2002 | Lortz et al. ................... 710/10 |
| 6,460,120 | B1 | | 10/2002 | Bass et al. .................. 711/148 |
| 6,466,994 | B1 | * | 10/2002 | Burke et al. ................... 710/8 |
| 6,483,354 | B1 | | 11/2002 | Gasparik ..................... 327/112 |
| 6,484,215 | B1 | * | 11/2002 | Gibart et al. ................... 710/9 |
| 6,687,814 | B1 | * | 2/2004 | Duppong ....................... 713/1 |
| 2002/0040412 | A1 | * | 4/2002 | Estakhri et al. ............... 710/11 |
| 2002/0095533 | A1 | * | 7/2002 | Esterberg et al. .............. 710/8 |
| 2002/0103995 | A1 | | 8/2002 | Owen et al. ................... 713/1 |
| 2003/0005192 | A1 | * | 1/2003 | Swope et al. ............... 710/104 |
| 2004/0049610 | A1 | * | 3/2004 | Esterberg et al. .............. 710/8 |

OTHER PUBLICATIONS

PCT Notification of Transmittal of the International Search Report and the Written Opinion of the International Searching Authority, or the Declaration, PCT/US2004/003692, May 11, 2004.

* cited by examiner

*Primary Examiner*—Glenn A. Auve
*Assistant Examiner*—Donna K. Mason
(74) *Attorney, Agent, or Firm*—Baker Botts L.L.P.

(57) ABSTRACT

A method for communicating data is provided that includes storing one or more physical connectors associated with an input/output card and configuring the input/output card to a selected one of a slave, master, and passive mode. An identification for the input/output card may be provided to an end user, the identification reflecting a selected configuration parameter associated with the input/output card.

16 Claims, 2 Drawing Sheets

SYSTEM AND METHOD FOR CONFIGURING AND DEPLOYING INPUT/OUTPUT CARDS IN A COMMUNICATIONS ENVIRONMENT

TECHNICAL FIELD OF THE INVENTION

This invention relates in general to input/output cards and more particularly to a system and method for configuring and deploying input/output cards in a communications environment.

BACKGROUND OF THE INVENTION

Data communications has become increasingly important in today's society. One aspect associated with data communications relates to the use of input/output cards. Input/output cards may be generally assigned resources and/or configured to operate in a certain mode. These modes, such as master and slave protocols, allow a given input/output card to operate in a designated manner. One problem associated with systems that include input/output cards is that end users or pilots may misconfigure or incorrectly assign resources or identities to components, devices, or elements. This may be important in cases where some entity relies on the identification of a corresponding input/output card to implement a particular functionality or device in a corresponding architecture. In other scenarios, input/output cards may generally have restricted adaptability and limited versatility. These deficiencies may operate to inhibit system performance and provide inadequate solutions for data communications systems.

SUMMARY OF THE INVENTION

From the foregoing, it may be appreciated by those skilled in the art that a need has arisen for an improved configuration and deployment approach that allows for input/output cards to be efficiently managed and configured to operate in varying architectures or environments. In accordance with one embodiment of the present invention, a system and method for configuring and deploying input/output cards in a communications environment are provided that substantially eliminate or greatly reduce disadvantages and problems associated with conventional configuration and deployment techniques.

According to one embodiment of the present invention, there is provided a method for communicating data that includes storing one or more physical connectors associated with an input/output card and configuring the input/output card to a selected one of a slave, master, and passive mode. An identification for the input/output card may be provided to an end user, the identification reflecting a selected configuration parameter associated with the input/output card.

Certain embodiments of the present invention may provide a number of technical advantages. For example, according to one embodiment of the present invention, a configuration and deployment approach is provided that avoids manual configurations, retains a consistent assignment of an identity associated with an input/output card, and necessitates minimal changes to a corresponding protocol. In addition, the system offered by the present invention provides a mechanism by which an end user may receive immediate feedback as to the identity of a given input/output card with minimal inspection or inquiry. This is a result of an input/output connector card that signals an identity to a pilot or to an end user.

Another technical advantage associated with one embodiment of the present invention relates to the increased versatility of a corresponding input/output card. This is due, in part, to the ability of the system provided to accommodate manually configured and automatically configured resources. This may allow, for example, a legacy component to coexist with an input/output card in the same architecture. This may further allow for enhanced flexibility in facilitating a mixture of automatically and manually configured devices that may operate in a 'plug and play' fashion. This 'plug and play' scenario may be achieved without having to significantly modify a corresponding architecture. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
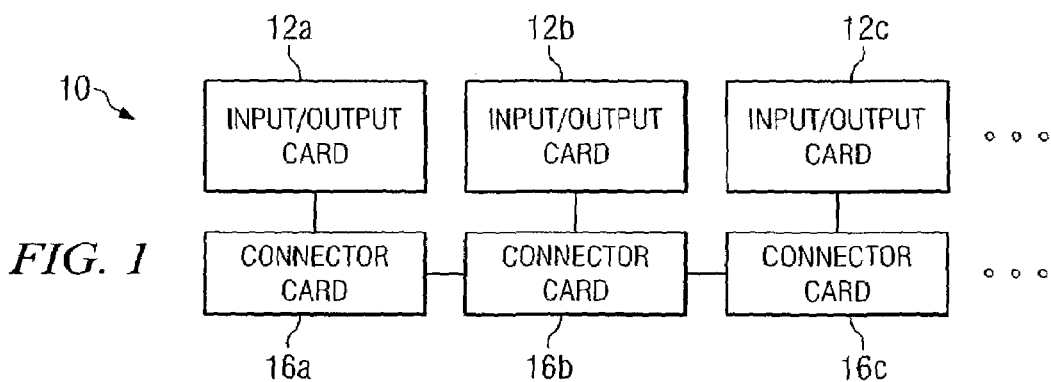
FIG. 1 is a simplified block diagram of a communication system for configuring and deploying elements in a communications environment.

FIG. 1 is a simplified block diagram of a communication system 10 for configuring and deploying elements in a communications environment. Communication system 10 may include one or more input/output cards 12a–c. Each of input/output cards 12a–c may be coupled to a respective connector card 16a–c. Communication system 10 may be positioned in any suitable communications environment, such as in a card stack that is operable to facilitate packet-based information exchanges. Alternatively, communication system 10 may be positioned in a circuit-switched network or in any other suitable environment where input/output cards 12a–c may be implemented in order to perform some operation or task. In a particular embodiment of the present invention, communication system 10 may be implemented in conjunction with a PC104 or a PC104+ protocol. PC104 and PC104+ reflect industry standard computing platforms that are compatible with communication system 10. Alternatively, communication system 10 may be implemented in conjunction with any other suitable protocol according to particular needs.

In accordance with the teachings of the present invention, communication system 10 provides an architecture in which input/output cards 12a–c may auto-identify and auto-configure themselves. This may be accomplished in cooperation with connector cards 16a–c. Connector cards 16a–c may recognize surrounding components and accordingly assign identities based on the presence of other elements in an architecture or stack within communication system 10. Connector cards 16a–c may properly signal the identification of input/output cards 12a–c to an end user or pilot.

Additionally, connector cards 16a–c may communicate with input/output cards 12a–c in order to direct operations or to designate a mode that is assigned for each card. The mode may be slave, master, or passive, and be based on particular needs of the system or architecture.

The configuration of connector cards 16a–c does not require manual configuration by an end user or pilot. Additionally, the configuration of communication system 10 operates to retain or hold a consistent assignment of identities for each of input/output cards 12a–c. Moreover, connector cards 16a–c provide a mechanism by which an end user may receive positive feedback as to the identity of a given input/output card 12a–c. Also, connector cards 16a–c, as well as input/output cards 12a–c, may simultaneously accommodate manually configured and automatically configured resources in communications system 10.

In general, devices are not able to coexist in automatic and manual configurations. Connector cards 16a–c avoid this problem and provide an environment in which a mixture of automatically and manually configured elements may properly coexist. This allows communication system 10 to offer plug and play capabilities for a corresponding architecture, such as a personal computer (PC) for example. In addition, resources may be properly assigned in communication system 10, which provides the capability to reasonably predict designated operations for each slot in a given architecture.

Input/output cards 12a–c are data processing elements that may be inserted into a given slot of an architecture or a system stack. Input/output cards 12a–c may fit together in parallel, whereby the connector of one card may receive the pin of the card above it. Input/output cards 12a–c may share one or more of the same signals. Input/output cards 12a–c may include appropriate processing capabilities, as well as memory storage that facilitates data processing and data propagation in a particular environment. Input/output cards 12a–c may be routers, Ethernet cards, fast serial cards, universal serial bus (USB) cards, switches, bridges, gateways, or any other appropriate elements suitable to facilitate data exchanges in a communications environment. Input/output cards 12a–c may include any suitable hardware, software, element, or object operable to facilitate these or additional operations in accordance with particular needs.

Connector cards 16a–c are input/output cards that include the physical connectors for each input/output card 12a–c respectively. The connectors may include Ethernet connectors or serial connectors for example. Alternatively, connector cards 16a–c may be any other suitable device or component and include any other suitable connector that is provided to (or cooperates with) input/output cards 12a–c. Connector cards 16a–c may resolve their addresses (i.e. their respective input/output cards 12a–c) by using a daisy-chained bus configuration that exists between them and that may further allow each of them to know what elements are below or above them. Without such a configuration implemented by connector cards 16a–c, inadequate protocols may otherwise haphazardly sequence input/output cards 12a–c. Connector cards 16a–c may include any suitable hardware, software, elements, or objects operable to assist in automatically configuring a given input/output card and/or to signal (to an end user or pilot for example) the identity of a corresponding input/output card 12a–c.

Failure to operate switches properly in a given stack by an end user or a pilot may cause significant problems. For example, bus transfers could be problematic in cases where cards are incorrectly configured or inaccurately identified. Additionally, architectures or stacks that may include input/output cards 12a–c are generally embedded (and often hidden) and, in most cases, complex. Input/output cards 12a–c avoid such a dilemma because they may communicate with each other and execute identification, assignment, and coordination operations with a master peripheral component interconnect (PCI) device. In this sense, input/output cards 12a–c are aware of each other and legacy components and may configure themselves accordingly and signal this to an end user.

Figure 2:
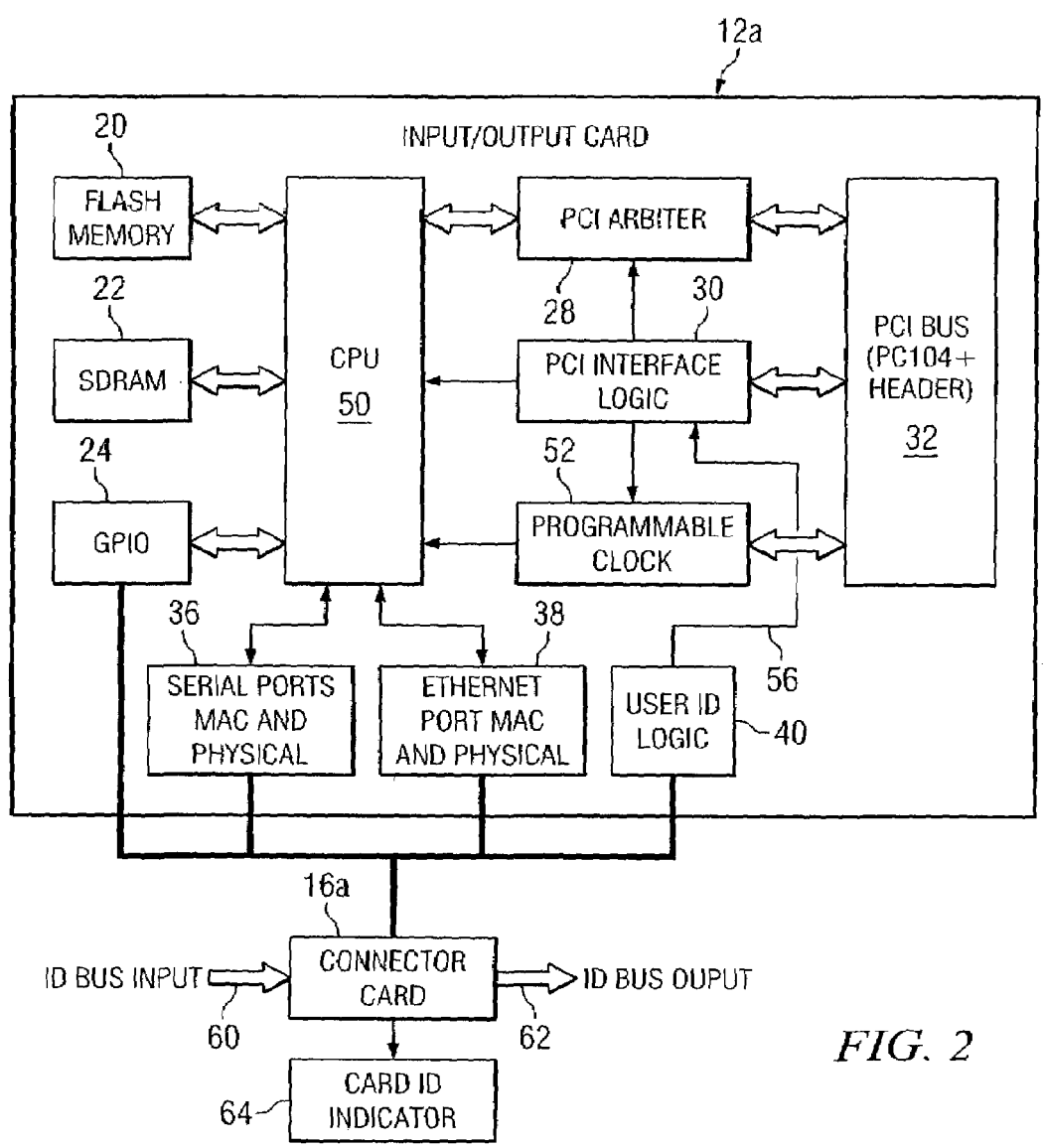
FIG. 2 is a simplified block diagram of an input/output card that illustrates additional details associated with the system.

FIG. 2 is a simplified block diagram of input/output card 12a illustrating various elements that may be included within (or external to) input/output card 12a. The elements illustrated within input/output card 12a are provided for purposes of teaching only and should therefore be construed as such. Moreover, because the internal structure of input/output card 12a has been offered for purposes of example only, numerous other components may be included therein that effectuate similar functionalities or operations. In addition, some of the components illustrated as within input/output card 12a may be deleted where appropriate and in accordance with particular needs.

In the example embodiment, input/output card 12a may include a flash memory 20 and a synchronous dynamic random access memory (SDRAM) 22. Flash memory 20 may contain a data structure that has the manually configured PCI card identifications stored in it and reflect elements such as card ID, card type, and whether one or more of the cards are enabled or disabled. SDRAM 22 may contain the active PCI card table that is a tuple of the preceding elements, i.e. card identification, card type, and enabled/disabled status.

Input/output card 12a may also include a general purpose input/output set of lines 24 that may be used to allow a master device to communicate card identifications that have been manually configured to connector card 16a. These identification elements are generally not used for auto assignment. Input/output card 12a may also include a PCI arbiter 28 that may be used when input/output card 12a is in a master mode. Input/output card 12a may also include a set of PCI interface logic 30 and a PCI bus 32. PCI interface logic 30 may view data from connector card 16a. PCI bus 32 may communicate using a PC104 (or PC104+) communications protocol that may be inclusive of a suitable header endemic to the particular protocol being implemented. PCI bus 32 may also be coupled to additional input/output cards where appropriate.

Input/output card 12a may also include a set of serial ports 36 and a set of Ethernet ports 38. Connector card 16a may provide physical connectors for Ethernet ports 38 and serial ports 36 and further provide an identification indicator signal for user identification logic 40. Input/output card 12a may additionally include a central processing unit (CPU) 50 and a programmable clock 52 that provides a synchronization function for input/output card 12a. Programmable clock 52 may provide a clock to PCI bus 32 when CPU 50 is in a master mode. Alternatively, programmable clock 52 may synchronize to a PCI bus clock within PCI bus 32 when CPU 50 is in a slave mode. Additionally, a signal 56 (as illustrated as an arrow between user identification logic 40 and PCI interface logic 30) may indicate the identification that CPU 50 has been assigned by connector card 16a.

There are generally three modes of operation that may be achieved by input/output cards 12a–c. In a first mode, a PCI master mode is achieved, whereby an arbiter function and clock function are provided by PCI arbiter 28 and programmable clock 52. In a second mode, a slave mode is achieved, whereby input/output card 12a operates as a PCI option device and it turns off its arbiter function. It may then synchronize its clock at programmable clock 52 to the PCI bus instead. In a third mode, a passive mode is achieved, whereby input/output card 12a rests within PCI bus 32. In this mode, the corresponding device is neither slave nor master and therefore it does not monitor PCI bus 32. What may determine the mode is the identification as provided by connector card 16a.

In scenarios where only one input/output card 12a is provided, the only one connector card 16a is present in the architecture. Thus, nothing is on ID bus input 60 because nothing is coupled to input/output card 12a. Similarly, there is nothing on ID bus output 62 because there is nothing stacked on top of input/output card 12a. In recognizing that it is the only card in the stack or system, input/output card 12a may respond (in the example configuration) by entering a master mode. This signal may be communicated to user ID logic 40, whereby input/output card 12a responds by providing or supplying a PCI clock function and an arbitration function.

In operation of an example implementation, connector card 16a represents a stack through connector to input/output card 12a that contains the physical connectors for input/output card 12a. Based on the physical order in which the cards may be stacked, a base card identification may be incremented via connector card 16a. This may be effectuated through an identification bus input 60, whereby a subsequent identification bus output 62 is provided to a subsequent input/output card. For example, the first card in a given stack may have an identification of four that designates the master for PCI bus 32. Such a card may know it is the first card in the stack because on its input bus there is no element to drive any other identification to it and therefore the identification pins on connector card 16a are pulled to identification four (e.g. bit two high). The master card may then add one to its card identification value and drive its output pins to five at ID bus output 62. Now, when an input/output card is stacked on the master card's connector card, it may receive five on its input and assign itself to PCI slot one. It may then subsequently proceed to add one to its input value and drive six on the output bus and so forth.

An end user or a pilot may better understand the configuration of a given system associated with input/output card 12a by viewing a signal or indication generated by connector card 16a at a card identification indicator 64. Card identification indicator 64 may be a liquid crystal display (LCD), light emitting diode (LED), or any other suitable element that operates to signify an identification parameter (or identity) of input/output card 12a. This identity may be consistent and may hold true from 'boot to boot' and even in cases where the card may be replaced in communication system 10. Any suitable identification parameter may be displayed by a selected connector card 16a–c (e.g. via card identification indicator 64). For example, the LCD or LED may communicate slot identities to an end user visually such that input/output cards 12a–c may be properly mapped out or configured. This allows the end user or pilot to avoid setting any switches or attempting to configure any elements in an improper fashion. Alternatively, identification parameters may be inclusive of the particular mode in which a corresponding input/output card 12a–c is operating. Other configuration identification parameters may include capacity or performance characteristics, activity status, connector information, or information associated with other elements in the corresponding architecture.

Communication system 10 provides a protocol that allows input/output cards 12a–c to auto-identify themselves. Depending on how they are stacked, input/output cards 12a–c may automatically assign identifications. For example, if an end user stacked elements such that the serial port was the first card, a serial port as a second card, and an Ethernet port as the third card, then port one equals serial, port two equals serial, and port three equals Ethernet. Thus, as input/output cards 12a–c are plugged into the stack, their identities may be assigned to their hosting card.

If serial port one is taken from the input/output stack and its cable is plugged into the first PC104 bus card, it then becomes PCI resource one because the input/output card indicated to it that it should be number one. If this is unplugged from the first serial card in the PC104 stack then plugged into the second card instead, then the second card will become PCI resource number one because it is plugged into input/output card number one. Thus, the responsibility of delegating the identification of PCI resources in the PC104 stack is given to input/output card 12a (in cooperation with connector card 16a) as opposed to the PC104 bus card.

In operation, card ID indicator 64 may communicate to a pilot or end user that it is the base card. Card ID indicator 64 may indicate that connector card 16a has a serial port and an Ethernet port. It may further indicate to the user that the serial port is serial one, and the Ethernet port is Ethernet one. Thus, when the end user or pilot goes to configure these ports (at the software or hardware level) he may know that serial one is on this given card. In the case where there are two input/output cards, they may connect through two points. The first point of connection is through PCI bus 32 (sharing the PCI backplane). The second point of connection is through connector cards 16a–c, which may couple to each other. ID bus output 62 may communicate to the next card in the chain that its corresponding card is card one. The next card may recognize that it has card one below it and accordingly identify itself as card two. The second card may then define its indicator such that its serial port is serial two and its Ethernet port is Ethernet two.

Input/output card 12a may also accommodate legacy input/output cards that are provided in a given system. Accordingly, a master card may be configured to know about potential cards that implement manual identification elements. For example, card identification (slot) one may be manually defined. Because the master card may start the counting sequence for automatic assignment and because the master card may know about the manually configured cards (through some sort of configuration as may be stored in flash memory 20), it can simply add some constant other than one to its identification bus output 62 to make room for a manually configured card.

In order to address scenarios in which multiple master devices are present in the same stack or architecture, consider that by definition a PCI backplane may consist of a master device and zero or more slave devices. In a particular embodiment that implements the PC104+ standard, the same assumption may be made and thus a single master device may be accommodated on the PCI backplane. The master device may be responsible for arbitration on the PCI backplane and use a master/slave concept for this purpose. Specifically, a slave device may request access to PCI bus 32 by asserting one of several PCI request lines. The master may then decide, from the many potential requesters, which device to grant access to PCI bus 32 by asserting one of several corresponding grant lines.

At the point of a given communications element (e.g. router) where the main card of the router executes input output supervision (IOS) and is typically the PCI master, it may subsequently have zero or more slave devices attached via a PCI backplane. Those devices may be PCI slave devices providing some form of input/output, such as an Ethernet card for example. This arrangement may be physically embodied in a form that consists of a larger motherboard with several PCI connectors for daughters cards to be plugged into. In such an arrangement, more than one motherboard may not be possible. However, in a PC104 or PC104+ environment, cards may stack through and have the same general size and connector types. In such a case, more than one input/output card 12a–c may be placed into the same stack physically. PCI arbiter 28 may then be coupled to PCI bus 32 on a PC104 or PC104+ stack. This may operate to exploit the card identification derived by an auto-configuration (that may be generated by one or more algorithms) in order to allow a master card to act in one of three modes.

In an example implementation, while in a first mode and when the card detects its ID is four, then the corresponding card is assigned as the PCI master. In a second mode, when the card detects its ID is five, six, seven, or eight, it is in a PCI slave mode. In a third mode, when the identification is none of the above, it may be presumed that the card is in a passive PCI role in which it does not communicate or load PCI bus 32.

The combination of card identification and a modified arbiter/PCI interface allows input/output cards 12a–c to be stacked with other devices in order to form a more scaleable and robust platform. In a passive mode, a selected input/output card 12a–c may be added to a stack in which some foreign device (such as a PC for example) may utilize the PCI backplane and the selected input/output card 12a–c no longer provides or supports PCI functionality but continues to share space and power.

In operation of an example embodiment, input/output cards 12a–c may be powered up. Input/output cards 12a–c may be physically stacked in a particular order, whereby the PC104+ cards are physically stacked in a separate order (this may be the same or it may be different). The two stacks may then be connected by coupling cables between the two elements. This may determine the order in which the system operates. Power may then be applied to the PC104+ stack, which may also provide power to input/output cards 12a–c.

An auto-identification may then be executed. The auto-identification may be effectuated using suitable software or algorithms that automatically configure an identification associated with input/output cards 12a–c. Input/output cards 12a–c may collectively realize their order and their respective identities. This may occur in parallel with the power up of a PC104+ stack. The power up sequence may involve a master that controls a reset pin on the backplane. This may keep everyone in 'reset' until the master is ready to initialize the system. The master may then hold off on starting power up until some input/output card 12a–c informs the master that it is operating in the master mode. Other input/output cards 12a–c may stay in a slave mode. The master may then initialize (e.g. stabilizing the PCI and processor clocks), which allows it to become the master. The master may then release the PCI backplane, which generally has a designated power-up sequence.

The master may then execute a series of identification checks or other suitable initialization protocols. The master may then discover what is on the backplane and what kind of resources (input/output cards 12a–c) the backplane requires. A PCI initialization sequence may then be executed. Once the initialization sequence is finished, the backplane may be freed to be arbitrated such that normal traffic may propagate.

Input/output cards 12a–c may already have their identities from their respective connector card 16a–c (that already previously resolved any potential conflicts). Suitable hardware or software may be included in user ID logic 40 that decodes the identification, which comes from connector card 16a. User ID logic 40 may determine that input/output card 12a should be the master in a given system or scenario. This signaling is reflected by signal 56, which then implements master functionality (arbiter and clock). These two functions may be isolated in order to avoid an error condition involving a legacy input/output card. Legacy cards generally have their PCI role and identification fixed. A connector card may select an address that is in conflict with the legacy card. In such a case, user ID logic 40 may communicate a signal indicating to the corresponding card that it cannot be card number two (for example) and that it may have to choose to be another card. Therefore, even though the card below connector card 16a may be one, a subsequently stacked card may have to choose three and put that on a corresponding indicator or identification bus output line. User ID logic 40 may then communicate to PCI interface logic 40 that the card is now three and not two. Accordingly, user ID logic 40 may perform this function (and not just relay the choice of connector card 16a) in that it can reject the identification and make room or accommodate a legacy element. In this sense, PCI interface logic 40 is enhanced because it allows all three modes. The mode that is selected is based on signal 56 that indicates whether a given input/output card is a master, slave, or passive element.

The master may then poll each of the slave cards in order to discover what serial cards, input/output cards, Ethernet cards, etc. are currently in the stack. Their master may get the identity information and initialize a set of device drivers so that it can communicate with each of them. The master may identify when a direct memory access (DMA) transfer occurs from identity two and, further determine, that the transfer is propagating from a serial port, an Ethernet port, or any other suitable port. At this point, the system is operational as the stack is running and the input/output panels have determined the slot addresses of the given input/output cards. Thus, the master finds out that it is the master from the input/output panel and then executes a power up sequence for PCI and then one or more slaves may report their identity to the master.

Figure 3:
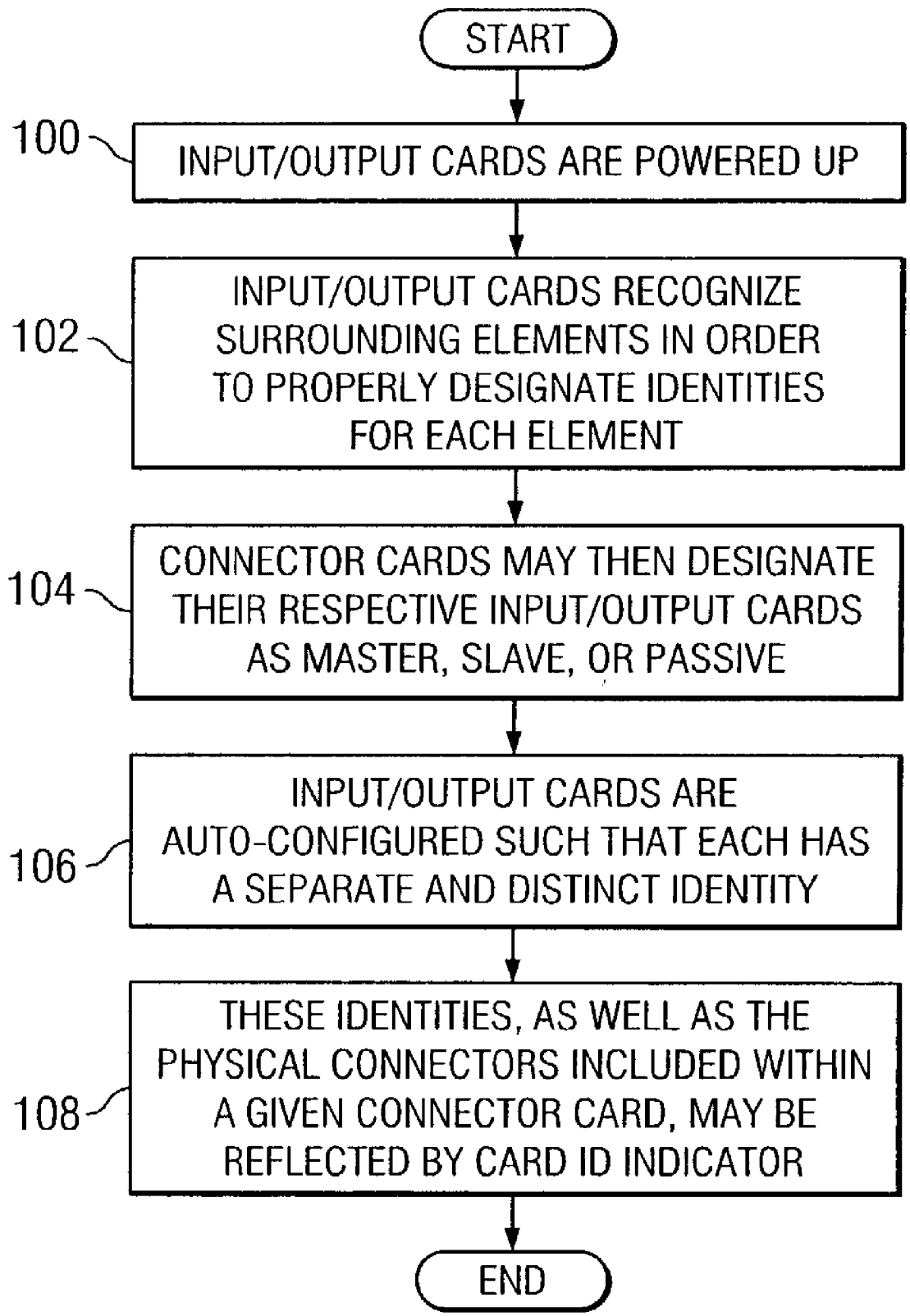
FIG. 3 is a flowchart illustrating a series of example steps associated with a method for configuring and deploying elements in a communications environment.

FIG. 3 is a simplified flowchart illustrating a series of example steps associated with a method for configuring and deploying input/output cards 12a–c. The method may begin at step 100 where a set of input/output cards 12a–c are powered up. At step 102, input/output cards 12a–c in the architecture may recognize surrounding elements in order to properly designate identities for each element. Corresponding connector cards 16a–c may then designate their respective input/output cards 12a–c as master, slave, or passive at step 104. At step 106, input/output cards 12a–c are auto-configured such that each has a separate and distinct identity. At step 108, these identities, as well as the physical connectors included within a given connector card, may be reflected by card ID indicator 64 (which may be integral or provided as a separate component). For example, card ID indicator 64 may indicate that connector card 16a has a serial port and an Ethernet port and, further, that the serial port is serial one and that the Ethernet port is Ethernet one.

Some of the steps illustrated in FIG. 3 may be changed or deleted where appropriate and additional steps may also be added to the flowchart. These changes may be based on specific stack architectures or particular networking arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate particular routing architectures. In addition, any of these elements may be provided as separate external components to communication system 10 or each other where appropriate. The present invention contemplates great flexibility in the arrangement of these elements as well as their internal components.

In addition, although FIGS. 1 and 2 illustrate an internal arrangement of input/output card 12a, numerous other components may be used in combination with these elements or substituted for these elements without departing from the teachings of the present invention. Additionally, connector card 16a and card ID indicator 64 may be a single integral component where appropriate or input/output card 12a may include connector card 16a and card ID indicator 64 in a single module or device. Such variations may be dependent on the type of communication propagating through communication system 10 or dependent on particular networking needs or physical restrictions and space allocations.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for communicating data, comprising:
an input/output card that includes a processor operable to process data propagating through the input/output card;
a connector card coupled to the input/output card and inclusive of one or more physical connectors associated with the input/output card, wherein the connector card is operable to configure the input/output card to a selected mode and to provide an identification for the input/output card, the identification reflecting a selected configuration parameter associated with the input/output card; and
a legacy card coupled to a network stack that includes the input/output card, the legacy card being operable to facilitate data processing and data exchanges propagating through the legacy card, wherein the connector card configures the input/output card to the selected mode based on a mode associated with the legacy card.

2. The apparatus of claim 1, wherein the connector card further includes a card identification indicator operable to signal the identification of the input/output card to an end user.

3. The apparatus of claim 1, wherein the selected mode is one of a group consisting of:
a master mode;
a slave mode; and
a passive mode.

4. The apparatus of claim 1, wherein the input/output card further comprises user identification logic operable to receive a signal from the connector card that indicates the selected mode of the input/output card.

5. The apparatus of claim 4, wherein the input/output card further includes interface logic operable to implement a functionality corresponding to the selected mode.

6. The apparatus of claim 1, wherein the connectors of the input/output card are a selected one of a serial and an Ethernet port.

7. The apparatus of claim 1, further comprising:
an additional input/output card that includes a processor operable to process data propagating through the additional input/output card; and
an additional connector card coupled to the additional input/output card and operable to configure the additional input/output card to a selected mode based on the configuration of the input/output card, the additional connector card being further operable to provide an additional identification for the additional input/output card, the additional identification reflecting a selected configuration parameter associated with the additional input/output card.

8. A method for communicating data, comprising:
providing one or more physical connectors associated with an input/output card;
configuring the input/output card to a selected one of a slave, master, and passive mode;
providing an identification for the input/output card to an end user, the identification reflecting a selected configuration parameter associated with the input/output card; and
configuring the input/output card to the selected mode based on a mode associated with a legacy card, wherein the legacy card and the input/output card are provided together in a network stack.

9. The method of claim 8, further comprising:
signaling the selected mode to logic included within the input/output card, the logic being operable to effectuate a selected operation that corresponds to the selected mode based on the signaling.

10. The method of claim 8, further comprising:
configuring one or more additional input/output cards to a selected mode based on the configuration of the input/output card, wherein the additional input/output cards are included in a network stack that includes the input/output card, and wherein requests for data transfers along a backplane associated with the network stack are arbitrated amongst all of the cards.

11. A system for communicating data, comprising:
means for providing one or more physical connectors associated with an input/output card;
means for configuring the input/output card to a selected one of a slave, master, and passive mode; and
means for providing an identification for the input/output card to an end user, the identification reflecting a selected configuration parameter associated with the input/output card; and
means for configuring the input/output card to the selected mode based on a mode associated with a legacy card, wherein the legacy card and the input/output card are provided together in a network stack.

12. The system of claim 11, further comprising:
means for signaling the selected mode to logic included within the input/output card, the logic being operable to effectuate a selected operation that corresponds to the selected mode based on the signaling.

13. The system of claim 11, further comprising:

means for configuring one or more additional input/output cards to a selected mode based on the configuration of the input/output card, wherein the additional input/output cards are included in a network stack that includes the input/output card, and wherein requests for data transfers along a backplane associated with the network stack are arbitrated amongst all of the cards.

14. Software embodied in a computer readable medium, the computer readable medium comprising code operable to:

provide one or more physical connectors associated with an input/output card;

configure the input/output card to a selected one of a slave, master, and passive mode;

provide an identification for the input/output card to an end user, the identification reflecting a selected configuration parameter associated with the input/output card; and configure the input/output card to the selected mode based on a mode associated with a legacy card, wherein the legacy card and the input/output card are provided together in a network stack.

15. The medium of claim 14, wherein the code is further operable to:

signal the selected mode to logic included within the input/output card, the logic being operable to effectuate a selected operation that corresponds to the selected mode based on the signaling.

16. The medium of claim 14, wherein the code is further operable to:

configure one or more additional input/output cards to a selected mode based on the configuration of the input/output card, wherein the additional input/output cards are included in a network stack that includes the input/output card, and wherein requests for data transfers along a backplane associated with the network stack are arbitrated amongst all of the cards.

* * * * *